United States Patent [19]

Serres et al.

[11] Patent Number: 5,735,472
[45] Date of Patent: Apr. 7, 1998

[54] ROTATING DRUM COMPRISING SCREENING AND MASHING CHAMBERS FOR SEPARATING PAPER FIBERS AND CONTAMINANTS

[75] Inventors: Alain Serres, Reims; Roland Fejoz, Vitry Le Francois, both of France

[73] Assignee: E & M Lamort, Vitry Le Francois, France

[21] Appl. No.: 679,519

[22] Filed: Jul. 12, 1996

[30] Foreign Application Priority Data

Jul. 13, 1995 [FR] France .................. 95 08499

[51] Int. Cl.[6] .................................................. B02C 23/16
[52] U.S. Cl. ................................ 241/79.3; 241/80; 241/81; 241/DIG. 10; 241/21; 162/4; 162/55; 210/174
[58] Field of Search .................... 162/55, 4; 210/174, 210/252; 241/79.3, 81, 21, 80, DIG. 10, 162, 209, 210, 241

[56] References Cited

U.S. PATENT DOCUMENTS

| 4,382,559 | 5/1983 | Hellberg | 241/79.3 |
| 4,447,320 | 5/1984 | Lamort | 209/273 |
| 4,818,339 | 4/1989 | Lamort | 162/4 |
| 5,341,936 | 8/1994 | Young | 209/17 |

FOREIGN PATENT DOCUMENTS

| 0 370 118 | 5/1990 | European Pat. Off. |
| 2 663 240 | 12/1991 | France |

Primary Examiner—Donald E. Czaja
Assistant Examiner—Dean T. Nguyen
Attorney, Agent, or Firm—Lowe, Price, LeBlanc & Becker

[57] ABSTRACT

Method for separating paper fibers and contaminants for mixtures containing water, fibers, contaminants, paper or cardboard pellets, wherein the mixture is subjected firstly to a screening, secondly to a mashing and then thirdly to a further screening with addition of water, subsequent to which the pulp retained by the screen is evacuated.

7 Claims, 3 Drawing Sheets

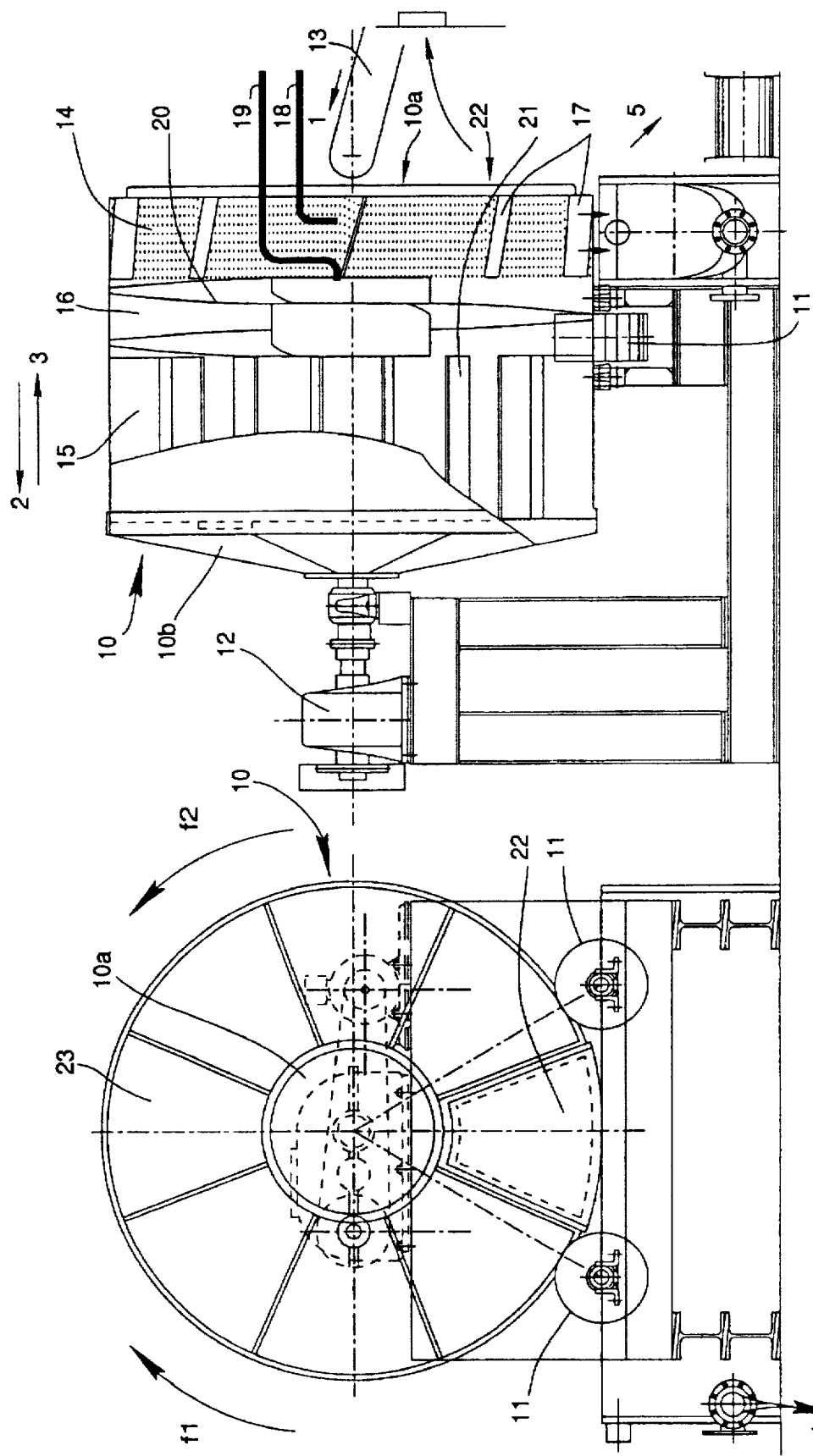

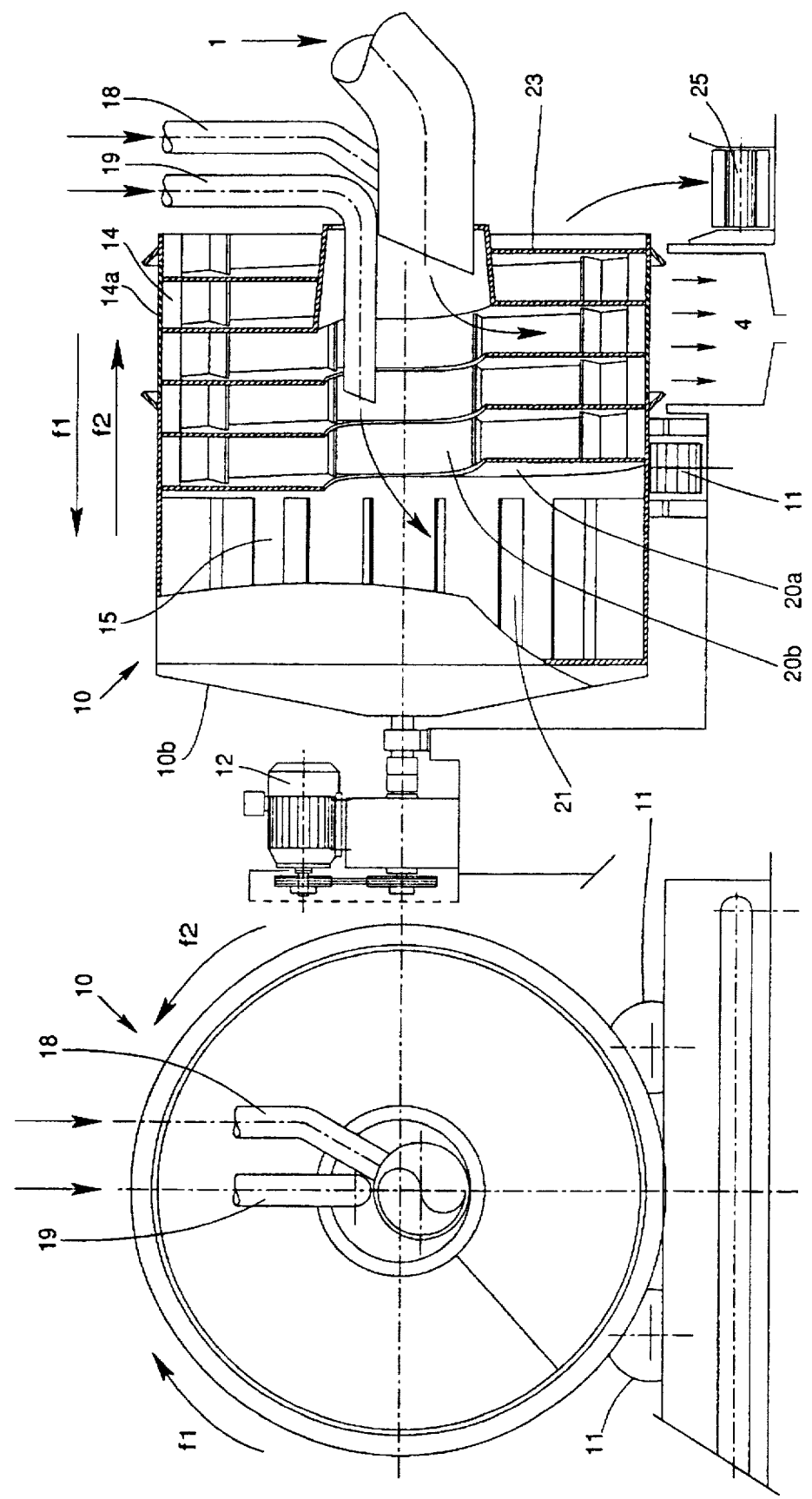

ROTATING DRUM COMPRISING SCREENING AND MASHING CHAMBERS FOR SEPARATING PAPER FIBERS AND CONTAMINANTS

BACKGROUND OF THE INVENTION

1. Field of the Invention

This invention relates to the used paper recycling industry.

2. Description of the Prior Art

A used paper recycling chain comprises a device known as a pulper in which bales of used papers are slushed in water in order to form a pasty liquid called pulp. This pulp contains not only paper fibers but also numerous foreign bodies: e.g. scraps of sheets of plastic, metal scraps such as staples, paper clips, rivets; and even all sorts of scraps mixed into the bales of used papers during used paper recovery operations. All these foreign bodies are usually called "contaminants". There are different types of pulpers such as e.g. screw type pulpers comprised of a tank in the shape of a revolution volume, at the base and in the center of which a helicoid device is situated. The recovered papers are fed into this tank, water is added and the rotation of the helicoid device causes an intense mashing in the course of which the papers are disintegrated by attrition. Such an operation lasts approximately 30 minutes at the end of which the tank is filled with a pasty liquid comprising the paper pulp and the contaminants.

Sometimes the mixture of used papers contains papers which, in order to be processed into pulp, require either a longer dwell time or a higher temperature or even the addition of chemical products such as sodium carbonate, sulphuric acid, etc., in which case the mixture obtained contains the pulp, the contaminants and the pellets which are fragments of paper or cardboard.

The pulper is then emptied into an evacuation device comprising a means for separating the contaminants from the pulp. This device is often referred to as an "dumping poire", this term signifying that it is alternately filled and emptied. The operating of a dumping poire is approximately one-fifth of the operating time of the pulper. A dumping poire usually comprises a screen in front of which moves a cleaning device commonly referred to as a "foil". The object of this device is to prevent the contaminants from clogging the screen.

Obviously, as the paper pulp passes through the screen and is evacuated, the proportion of contaminants and pellets in the dumping poire increases; as a result of this, as the pulper becomes emptier, it becomes increasingly difficult to avoid the screen clogging up with the contaminants and pellets, all the more so that the mass of contaminants and pellets constitutes a sort of filtering body which retains a not inconsiderable quantity of pulp.

A proposal was then put forward to evacuate the fraction retained (at least partially) outside of the dumping poire as the pulper empties itself.

This method produces good results, but a not inconsiderable quantity of pulp is nonetheless drawn off with the contaminants and is therefore lost.

Likewise, pellets are lost that could be transformed into pulp and recovered.

OBJECT OF THE INVENTION

The main object of this invention is to remedy the preceding disadvantages, particularly to provide a method comprising the known stages of pulping in a pulper, emptying the pulper into a dumping poire, extracting the retained fraction from the dumping poire, and recovering the pulp and pellets drawn off with the contaminants, characterized in that this additional operation comprises the following stages: firstly screening, secondly mashing of the retained fraction, thirdly re-screening and subsequently final rejection of the contaminants.

This method is not limited to the processing of the fraction retained by the dumping poire but usually applies each time the contaminants evacuated by any item of equipment comprises pulp and possibly pellets.

This invention also relates to a device for the implementation of said method characterized in that it comprises a screening zone and a mashing zone.

SUMMARY OF THE INVENTION

This device is preferably comprised of a cylindrical drum of substantially horizontal axis of gradient included between 0° and 15°, and comprising two chambers: a screening chamber and a mashing chamber and a means for moving the products from the screening chamber to the mashing chamber and back again to the screening chamber.

Preferably, the cylindrical drum is rotatable about its axis in one or other direction and comprises a helicoid device which, when the drum rotates in one direction, moves the contaminants to displace them from the screening chamber to the mashing chamber, and when the drum rotates in the opposite direction, returns said contaminants and their washing water to the screening chamber where the pulp-laden water is separated from said contaminants.

According to a first embodiment, the drum comprises an additional chamber situated between the screening chamber and the mashing chamber, this additional chamber being entirely taken up by an Archimedean screw.

According to a second embodiment, the screening chamber comprises an Archimedean screw bored in the middle with a cylindrical or conical bore through which the substances to be processed and the washing water arrive.

BRIEF DESCRIPTION OF THE DRAWINGS

Further features and advantages of the invention will be apparent from embodiments of the invention described, by way of non-limiting examples, in reference to the corresponding accompanying drawings in which:

FIG. 2 is a longitudinal cut-away view of a first embodiment;

FIG. 3 is an end view of FIG. 2;

FIG. 4 is a longitudinal cut-away view of a second embodiment;

FIG. 5 is an end view of FIG. 4;

DESCRIPTION OF THE PREFERRED EMBODIMENTS

Figure 1:
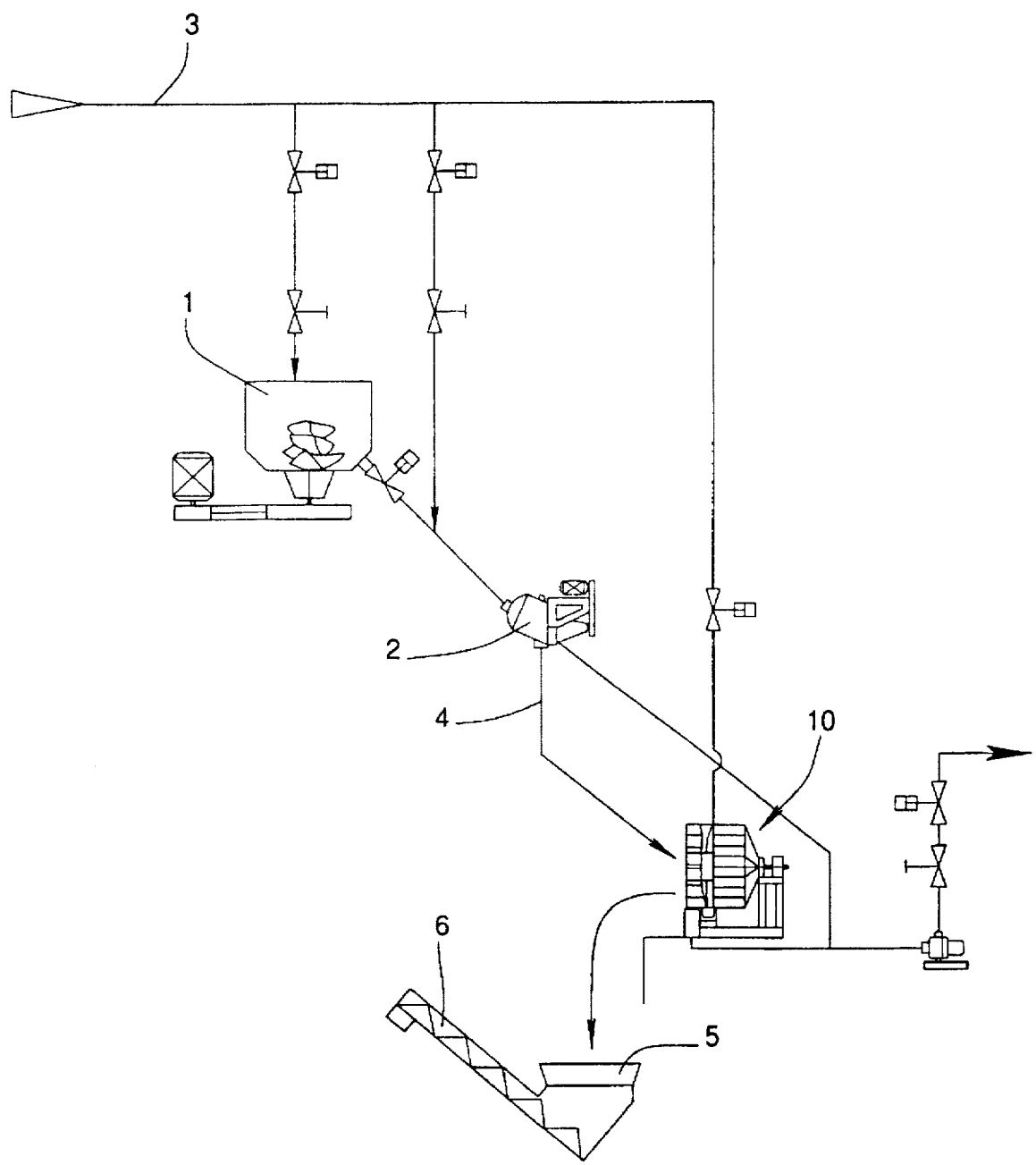
FIG. 1 is a schematic view of an installation comprising a device embodying the invention.

In reference to FIG. 1, the used paper processing installation can be seen to comprise, as is known, a pulper 1 of the helicoid pulper type, and dumping poire 2, the water arriving into the pulper 1 via a pipe 3.

In known devices the contaminants are evacuated from the poire 2 via a pipe 4 which leads them directly into the feed hopper 5 and a conveyor 6 which evacuates them.

It has been known to dispose, along the path of the contaminants, between the poire 2 and the evacuation conveyor 6, a bored drum called a trommel in which the contaminants are mashed, so that part of the pulp drawn off with the contaminants is recuperated.

However, this recuperation is insufficient as it is limited to a screening, whereas the method according to the invention comprises a screening, then a mashing and then a further screening.

In reference to FIGS. 2 and 3, it can be seen that, according to a first embodiment, the drum 10 is a drum with a substantially horizontal axis of gradient included between 0° and 15°, supported by rollers 11 and rotated by a transmission 12. The drum 10 is open at one of its ends 10a and closed at its other end 10b. The substances to be processed arrive into the opening 10a via a conveyor 13.

The drum 10 comprises a screening chamber 14, a mashing chamber 15 and, between these two, an intermediate chamber 16.

The wall of the chamber 14 is perforated and comprises a plurality of inclined blades 17. This chamber comprises a wall 23 fitted with a sight glass 22.

A water pipe 18 leads into the start of the screening chamber and another pipe 19 leads out of the screening chamber.

The intermediate chamber 16 is entirely taken up by an Archimedean screw 20 which has the twofold function of transferring the substances from the screening chamber 14 to the mashing chamber 15 and of ensuring tightness between these two chambers.

The screening chamber 15 comprises a plurality of blades 21 which are parallel to the axis of rotation of the drum. It is closed by the wall 10b and by the Archimedean screw 20 when the drum 10 rotates in the direction of the arrow f1.

The device thus described operates as follows: the drum 10 is rotated in the direction f1; the substance to be processed is inserted into the opening 10a via the conveyor 13. While the drum is rotating, the wall 23 prevents the substances from exiting. The paste which is still among the contaminants is partly separated by this mashing and drawn off with the residual water through the perforations of the chamber 14. The blades 17 gradually push the substances along to the intermediate chamber 16.

The Archimedean screw 20 transfers these substances to the chamber 15. When the chamber 15 is suitably full, water may be led in via the pipe 19 and the substances are mashed which has the effect of completely detaching the fibers from the contaminants.

The direction of rotation of the drum is then reversed (to become f2) and the Archimedean screw returns the substances together with the water into the screening chamber 14 where the fibers are evacuated with the water.

Water may be admitted via the pipe 18 in order to facilitate the driving of the pulp via the openings in the chamber 14.

The drum 10 is then brought to a halt, the sight glass 22 is removed and the contaminants are evacuated to the conveyor 6.

FIGS. 4 and 5 represent a second embodiment in which the same elements have the same references.

In this embodiment, there is no intermediate chamber 16 and the means for moving the substances is comprised of an Archimedean screw 20a of which the center comprises a central bore 20b.

The operation thereof is virtually identical. The substances are fed into the chamber 14 via a pipe of large diameter which leads into the central bore 20b of the screw 20a. The substances are firstly screened in the chamber 14, after which the substances retained advance to the chamber 15 where they are mashed by the blades 21, possibly in the presence of water led in by the pipe 19. This mashing has the effect of detaching all the fibers from the contaminants. The direction of rotation of the drum 10 is then reversed to become f2 and the substances together with the water are returned to the screening chamber 14 where the fibers are evacuated with the water. A final washing is then carried out in water led in via the pipe 18.

The contaminants thus cleaned and conveyed by the Archimedean screw 20a are poured out onto a conveyor 25.

The concentration increases as the substances advance towards the mashing chamber to the extent that, when the substances arrive in the chamber 15, this concentration may be too high, in which case it is preferable, in order to facilitate defibration, to dilute the concentration so as to bring it to an optimum value. The addition of water during the mashing stage is not obligatory. Conversely, during the third stage, i.e. during the final screening stage in the chamber 14 (after the direction of rotation has been reversed), the concentration of the pulp must be reduced to a concentration suitable for screening.

It is known that water, when hot, helps the defibration of pulp. The water led in during the mashing stage will therefore be preferably hot water.

Furthermore, chemical products such as sodium carbonate or possibly sulphuric acid may be added to this hot water.

We claim:

1. A device for separating paper fibers and contaminants from a mixture containing water, fibers, contaminants, paper or cardboard pellets, said device comprising:
   - a rotatable drum comprising a screening chamber for screening the mixture and a mashing chamber for mashing the mixture; and
   - means for moving the mixture from said screening chamber to said mashing chamber and back again to said screening chamber.

2. The device of claim 1 wherein, said drum is rotatable in opposite directions, and said moving means is operable to move the mixture from said screening chamber to said mashing chamber when said drum is rotated in one direction, and to move the mixture from said mashing chamber to said screening chamber when the drum is rotated in the opposite direction.

3. The device of claim 2 wherein, said moving means comprises a helicoid device.

4. The device of claim 3 wherein, said helicoid device is an Archimedean screw that is disposed in a chamber located between said screening chamber and said mashing chamber.

5. The device of claim 3 wherein, said helicoid device is an Archimedean screw having a bore through the center portion thereof for receiving the mixture.

6. The device of claim 2 further comprising, a first water pipe for providing water to said screening chamber, and a second water pipe for providing water to said mashing chamber.

7. The device of claim 2 wherein, the longitudinal axis of said drum is disposed at an angle of approximately 0 to 15 degrees to the horizontal.

* * * * *